(12) United States Patent
Shibayama et al.

(10) Patent No.: US 7,976,817 B2
(45) Date of Patent: Jul. 12, 2011

(54) METHOD FOR PRODUCTION OF IODINE HEPTAFLUORIDE

(75) Inventors: Takaaki Shibayama, Ube (JP); Atsushi Ryokawa, Ube (JP); Shuhei Yamada, Ube (JP)

(73) Assignee: Central Glass Company, Limited, Ube-shi (JP)

( * ) Notice: Subject to any disclaimer, the term of this patent is extended or adjusted under 35 U.S.C. 154(b) by 41 days.

(21) Appl. No.: 12/665,265

(22) PCT Filed: May 19, 2008

(86) PCT No.: PCT/JP2008/059131
§ 371 (c)(1),
(2), (4) Date: Dec. 17, 2009

(87) PCT Pub. No.: WO2008/155965
PCT Pub. Date: Dec. 24, 2008

(65) Prior Publication Data
US 2010/0196251 A1 Aug. 5, 2010

(30) Foreign Application Priority Data
Jun. 18, 2007 (JP) ................................ 2007-160304
Sep. 4, 2007 (JP) ................................ 2007-228449

(51) Int. Cl.
*C01B 7/24* (2006.01)
(52) U.S. Cl. ....................... 423/466; 423/462
(58) Field of Classification Search .................. 423/462, 423/466
See application file for complete search history.

(56) References Cited

U.S. PATENT DOCUMENTS

| 3,367,745 | A | * | 2/1968 | Tepp | ............................. | 423/466 |
| 3,615,206 | A | * | 10/1971 | Fogle et al. | .................... | 423/466 |
| 4,108,966 | A | * | 8/1978 | Lileck | ............................ | 423/466 |
| 2010/0166638 | A1 | * | 7/2010 | Yoshimi et al. | ............... | 423/466 |

FOREIGN PATENT DOCUMENTS

| DE | 2 035 521 | 1/1972 |
| GB | 1 326 130 | 8/1973 |
| JP | 46-4445 B1 | 2/1971 |
| JP | 2-39443 B2 | 8/1983 |
| JP | 2000-159505 A | 6/2000 |
| JP | 2006-265057 A | 10/2006 |

OTHER PUBLICATIONS

Walter C Schumb et al., "Iodine Heptafluoride Preparation and Some Properties", Industrial and Engineering Chemistry, Jul. 1950, pp. 1382-1387, vol. 42, No. 7.
International Search Report with partial translation dated Aug. 5, 2008 (Three (3) pages).
PCT/ISA/237 dated Aug. 5, 2008 (Three (3) pages).

\* cited by examiner

*Primary Examiner* — Ngoc-Yen M Nguyen
(74) *Attorney, Agent, or Firm* — Crowell & Moring LLP

(57) ABSTRACT

To provide, in an industrial scale production of iodine heptafluoride, a method for producing it easily and continuously, with a single reactor, efficiently and stably by putting iodine and fluorine directly into the reactor. To provide a method for producing iodine heptafluoride, characterized in that each of a fluorine-containing gas and an iodine-containing gas is supplied to a reactor, in which iodine heptafluoride is previously present, in order to suppress a local reaction when iodine and fluorine as the raw materials are put into the reactor, and the reaction is conducted while circulating and mixing the gas in the reactor.

12 Claims, No Drawings

METHOD FOR PRODUCTION OF IODINE HEPTAFLUORIDE

TECHNICAL FIELD

The present invention relates to a method for producing iodine heptafluoride, which is useful as a fluorinating agent, or as an etching or cleaning gas in electronics industry or atomic industry.

BACKGROUND TECHNIQUE

Hitherto, as a method for producing iodine heptafluoride ($IF_7$), there has been known a method for obtaining iodine heptafluoride by blowing fluorine ($F_2$) gas into a liquid of heated iodine pentafluoride ($IF_5$) and by making iodine pentafluoride accompanied by fluorine gas pass through a reaction zone of 280-290° C. (Non-patent Publication 1). Furthermore, there has been proposed a method in which iodine pentafluoride or iodine ($I_2$) is vaporized and mixed in a fluorine gas stream by using a vaporizer installed prior to a reactor, and then the mixed gas is introduced into the reactor heated to a temperature at which both of them react, thereby converting it into iodine heptafluoride (Patent Publication 1). It is described in Patent Publication 1 that the reaction cannot be continued by red heat at around the introducing port in the case of putting the raw material and fluorine directly into the reactor with no use of the vaporizer. On the other hand, as a method for producing iodine pentafluoride, there is proposed a method for producing iodine pentafluoride, in which solid iodine is dispersed in a iodine pentafluoride liquid previously produced, and then fluorine gas is blown with cooling at 20-30° C. (Patent Publication 2). As mentioned above, according to conventional iodine heptafluoride production methods, it is necessary to have a two-step reaction in which iodine pentafluoride is previously synthesized from iodine and fluorine, and then this is reacted with fluorine, or a complicated operation in which iodine pentafluoride or iodine is vaporized and mixed in a fluorine gas stream, and then the mixed gas is introduced into a reactor, thereby converting it into iodine heptafluoride.

Patent Publication 1: Japanese Patent Application Examined Publication No. 2-39443 B2
Patent Publication 2: German Patent No. 2035521
Non-patent Publication 1: Ind. Eng. Chem., 42, 1383 (1950)

DISCLOSURE OF THE INVENTION

Task to be Solved by the Invention

Iodine and fluorine are halogen simple substances and active substances, and it is necessary to give care to handling, too. It is, however, possible to safely handle both of them in industrial scale. Therefore, it is industrially extremely useful, if iodine heptafluoride can be produced by putting iodine and fluorine directly into a reactor and moreover by one-step reaction.

The present invention resides in providing, in an industrial scale production of iodine heptafluoride, a method for producing it easily and continuously, with one-step reaction, efficiently and stably by putting iodine and fluorine directly into a reactor.

Means for Solving the Task

In order to achieve the above object, as a result of repeated studies, the present inventors have found that it is possible to continuously and efficiently produce iodine heptafluoride in a single reactor by continuously supplying gaseous iodine and fluorine in the presence of iodine heptafluoride and by a gas-phase reaction, thereby reaching the present invention.

In a direction reaction between iodine and fluorine, the reaction occurs extremely vigorously to generate an enormous heat generation. Therefore, in a piston-flow type reactor with no exterior circulation apparatus such as one of conventional methods, even if it is a small-size reactor, the reactor is broken by immediately reaching a red heat condition. It is, however, possible to keep the reaction temperature constant by instantaneously diluting quantity of heat that is generated, with a large amount of a cooled circulating gas or a stirring and mixing gas.

Furthermore, when the formula (1) of the reaction between iodine and fluorine is compared with the formula (2) of the reaction between iodine and iodine heptafluoride, the latter reaction has a smaller heat of reaction per mol of iodine as compared with that of the former reaction. Therefore, it proceeds relatively mildly. Furthermore, iodine gas that is continuously supplied reacts with iodine heptafluoride in the circulating gas or the stirring and mixing gas in accordance with the formula (2), and it is rapidly converted into iodine heptafluoride by the reaction of formula (3) with fluorine. Therefore, there exists almost no iodine pentafluoride in the reaction gas, and it is possible to selectively obtain iodine heptafluoride.

$$I_2 + 7F_2 \rightarrow IF_7 (\Delta H_f^\circ = -460 \text{ kcal/mol}) \quad (1)$$

$$I_2 + 5IF_7 \rightarrow 7IF_5 (\Delta H_f^\circ = -203 \text{ kcal/mol}) \quad (2)$$

$$7IF_5 \rightarrow 7IF_7 (\Delta H_f^\circ = -203 \text{ kcal/mol}) \quad (3)$$

We have found that it is possible to make the reaction proceed far more mildly by the addition of the reaction between iodine and iodine heptafluoride, as compared with the reaction between iodine and fluorine, thereby reaching the present invention.

That is, the present invention provides a method for producing iodine heptafluoride, in which a reaction is conducted by supplying each of a fluorine-containing gas and an iodine-containing gas to a reactor where iodine heptafluoride is present, while circulating and mixing a gas in the reactor. Furthermore, it provides a method for producing iodine heptafluoride, in which a reaction is conducted by supplying each of a fluorine-containing gas and an iodine-containing gas to a reactor where iodine heptafluoride and fluorine are present, while circulating and mixing a gas in the reactor. Or it provides a method for producing iodine heptafluoride, in which the circulating and mixing gas in the reactor has a concentration of iodine heptafluoride of from 1 vol % to 98 vol % and a concentration of fluorine of from 2 vol % to 98 vol %.

Advantageous Effect of the Invention

According to the method of the present invention, when iodine heptafluoride is produced from fluorine and iodine, iodine heptafluoride is made to previously be coexistent to suppress a local reaction. With this, it is possible to produce iodine heptafluoride under a mild condition.

BEST MODE FOR CARRYING OUT THE INVENTION

In the following, the present invention is described in more detail.

An apparatus used in the present invention is satisfactory as long as it can continuously supply gaseous iodine and fluorine into the circulating and mixing gas in the reactor and as long as it has a structure capable of taking the gas in the reactor out. As the reactor, it is possible to use an interior circulation type or exterior circulation type reactor having a spontaneous radiation or forced cooling function. As the material of the reactor, it is possible to use nickel, Monel, Inconel, Hastelloy, aluminum, copper, iron, etc., but nickel, Monel, etc. are desirable for a high-temperature portion.

It is desirable to add fluorine gas to a place at which it is diluted with the circulating gas of the inside at the same time as it is supplied, in order to rapidly dilute it with the circulating gas. The fluorine gas to be used may be one in which hydrogen fluoride or a compound, such as $CF_4$, $O_2$, etc., that does not react with fluorine at room temperature is mixed. Furthermore, it may be diluted with an inert gas such as $N_2$, Ar, etc. It suffices that purity of the fluorine gas to be used is 2 vol % or higher. Furthermore, it is possible to synthesize iodine heptafluoride even if the fluorine concentration in the circulating and mixing gas prior to the raw materials supply and upon the raw materials supply is less than 2 vol %. 2 vol % or greater is, however, desirable in order to efficiently synthesize iodine heptafluoride. Furthermore, it is desirable that the fluorine concentration is not higher than 98 vol % in order to obtain the effect of making the reaction mild by the mixing of iodine heptafluoride.

In order to selectively obtain iodine heptafluoride, it is necessary that the fluorine supply flow rate is seven or more times the iodine supply flow rate. If it is less than seven times, iodine pentafluoride as an impurity is generated.

Iodine heptafluoride in the circulating and mixing gas prior to the raw materials supply and upon the raw materials supply is effective, even if it is in a small amount. It is, however, desirably 1 vol % or more for continuously conducting the production. Furthermore, since it is desirable that the fluorine concentration in the circulating and mixing gas is 2 vol % or more, it is desirable to set the iodine heptafluoride concentration in the circulating and mixing gas at 98 vol % or less.

Iodine is heated, vaporized, and supplied directly to the reactor. Iodine can be supplied alone, but it can more easily be supplied by using a carrier gas such as $N_2$, Ar, etc.

If the carrier gas concentration is too high, it becomes impossible to maintain the above-mentioned fluorine concentration and iodine heptafluoride concentration in the circulating and mixing gas under preferable conditions. Therefore, it is desirable that the iodine concentration in the carrier gas is 0.5 vol % or greater. In case that no carrier gas is used, iodine supplied to the reactor is instantaneously consumed by the reaction.

In order to obtain the diluting effect by the gas circulation, the flow rate of the circulating gas is 60 to 200,000 times, preferably 1,000 to 100,000 times, the flow rate of iodine.

It suffices that the gas residence time in the interior circulation type or exterior circulation type reactor is 30 seconds or longer, but 2 minutes or longer is desirable to obtain iodine heptafluoride of high purity.

It suffices that the reaction temperature is from 100° C. to 350° C. The reaction is slow at low temperature, and iodine heptafluoride is dissociated at high temperature. Therefore, it is desirable to maintain 150-320° C. in order to obtain iodine heptafluoride of high purity.

In the following, the present invention is specifically explained by examples.

Example 1

A stainless steel container having a volume of 2.3 L was charged with 1.5 kg of iodine made by Wako Pure Chemical Industries Ltd., followed by replacing the inside of the stainless steel container by $N_2$ purge and then heating the stainless steel container to 138° C. As the reactor, there was used an interior circulation type reactor made of Ni, having a volume of 4 L (diameter: 120 mm, length: 400 mm), and equipped with a stirrer. Prior to supplying fluorine and iodine to the reactor, the reactor heater was previously set at 230° C. The gas temperature of the inside also showed 230° C. Before starting the reaction, the stirrer was rotated at 900 rpm, and the gas circulation was conducted under a condition of a superficial linear velocity of 0.25 m/sec (interior circulation flow rate: 73.5 SLM). The gas composition in the reactor before starting the reaction was adjusted to 30 vol % iodine heptafluoride, 30 vol % fluorine, and 40 vol % $N_2$, and the total pressure was adjusted to 0.88 MPa. In the method for supplying iodine, $N_2$ gas was blown at a flow rate of 13 sccm into liquid iodine in the stainless steel container, and a saturation vapor pressure portion of iodine was mixed with $N_2$ gas to be supplied to the reactor. The iodine concentration in the mixed gas of $N_2$ and iodine was 27.7 vol %. Fluorine was supplied at a flow rate of 45 sccm from a place that was different from the iodine supply port. Gas was taken out of a reactor outlet formed at a place that was different from the supply port in order that pressure in the reactor after supplying fluorine and iodine may be maintained at a pressure that is the same as that before starting the reaction.

120 min and 240 min after starting supply of fluorine and iodine, the reactor outlet gas was analyzed by a Fourier transform infrared spectrophotometer (FT-IR) and a spectrophotometer (UV). As a result, at each time it was found to be 30 vol % iodine heptafluoride, 0.5 vol % iodine pentafluoride, 29.8 vol % fluorine, and 39.7 vol % $N_2$.

Furthermore, the gas temperature of the inside of the reactor upon the reaction gradually increased and became constant in 20 min. The gas temperature of the inside of the reactor at that time was 235° C., showing a temperature increase of 5° C. as compared with before the reaction.

Example 2

It was conducted in the same method as that of Example 1, except the gas flow rates. Regarding the gas supply flow rates, a mixed gas of $N_2$ and iodine was 18 sccm, and fluorine was 55 sccm. It was conducted at 27.7 vol % in iodine concentration in the mixed gas of $N_2$ and iodine.

120 min and 240 min after starting supply of fluorine and iodine, the reactor outlet gas was analyzed. As a result, both of 120 min and 240 min thereafter it was found to be 23.1 vol % iodine heptafluoride, 0.1 vol % iodine pentafluoride, 46.7 vol % fluorine, and 30.1 vol % $N_2$.

Furthermore, the gas temperature of the inside of the reactor upon the reaction gradually increased and became constant in 20 min. The gas temperature of the inside of the reactor at that time was 235° C., showing a temperature increase of 5° C. as compared with before the reaction.

Example 3

It was conducted in the same method as that of Example 1, except the gas flow rates. Regarding the gas supply flow rates, a mixed gas of $N_2$ and iodine was 18 sccm, and fluorine was 40 sccm. It was conducted at 27.7 vol % in iodine concentration in the mixed gas of $N_2$ and iodine.

120 min and 240 min after starting supply of fluorine and iodine, the reactor outlet gas was analyzed. As a result, both of 120 min and 240 min thereafter it was found to be 32.2 vol % iodine heptafluoride, 1.6 vol % iodine pentafluoride, 20.7 vol % fluorine, and 45.5 vol % $N_2$.

Furthermore, the gas temperature of the inside of the reactor upon the reaction gradually increased and became constant in 20 min. The gas temperature of the inside of the reactor at that time was 235° C., showing a temperature increase of 5° C. as compared with before the reaction.

Example 4

It was conducted in the same method as that of Example 1, except the gas composition in the reactor at the start of the reaction and the gas flow rates. The gas composition at the start of the reaction was adjusted to 1.5 vol % iodine heptafluoride, 2.5 vol % fluorine, and 96 vol % $N_2$. Regarding the gas supply flow rates, a mixed gas of $N_2$ and iodine was 95 sccm, and fluorine was 55 sccm. It was conducted at 5 vol % in iodine concentration in the mixed gas of $N_2$ and iodine.

120 min and 240 min after starting supply of fluorine and iodine, the reactor outlet gas was analyzed. As a result, 120 min thereafter it was found to be 8.0 vol % iodine heptafluoride, 0.3 vol % iodine pentafluoride, 15.7 vol % fluorine, and 76.0 vol % $N_2$. 240 min thereafter it was found to be 7.9 vol % iodine heptafluoride, 0.4 vol % iodine pentafluoride, 15.8 vol % fluorine, and 75.9 vol % $N_2$.

Furthermore, the gas temperature of the inside of the reactor upon the reaction increased until 10 min, then decreased, and became constant in 30 min. The gas temperature of the inside of the reactor was 245° C. in 10 min and 240° C. in 30 min.

Example 5

It was conducted in the same method as that of Example 1, except the gas composition in the reactor at the start of the reaction and the gas flow rates. The gas composition at the start of the reaction was adjusted to 50 vol % iodine heptafluoride, 2 vol % fluorine, and 48 vol % $N_2$. Regarding the gas supply flow rates, a mixed gas of $N_2$ and iodine was 10 sccm, and fluorine was 45 sccm. It was conducted at 50 vol % in iodine concentration in the mixed gas of $N_2$ and iodine.

120 min and 240 min after starting supply of fluorine and iodine, the reactor outlet gas was analyzed. As a result, 120 min and 240 min thereafter it was found to be 39.9 vol % iodine heptafluoride, 0.1 vol % iodine pentafluoride, 40.2 vol % fluorine, and 19.8 vol % $N_2$.

Furthermore, the gas temperature of the inside of the reactor upon the reaction increased until 5 min after the start and then became constant. The gas temperature of the inside of the reactor was 233° C. in 5 min, and the temperature increase was 3° C.

Example 6

It was conducted in the same method as that of Example 1, except the gas composition in the reactor at the start of the reaction and the gas flow rates. The gas composition at the start of the reaction was adjusted to 2 vol % iodine heptafluoride, 50 vol % fluorine, and 48 vol % $N_2$. Regarding the gas supply flow rates, a mixed gas of $N_2$ and iodine was 10 sccm, and fluorine was 45 sccm. It was conducted at 50 vol % in iodine concentration in the mixed gas of $N_2$ and iodine.

120 min and 240 min after starting supply of fluorine and iodine, the reactor outlet gas was analyzed. As a result, 120 min and 240 min thereafter it was found to be 39.9 vol % iodine heptafluoride, 0.1 vol % iodine pentafluoride, 40.2 vol % fluorine, and 19.8 vol % $N_2$.

Furthermore, the gas temperature of the inside of the reactor upon the reaction increased until 10 min after the start, then decreased, and became constant in 30 min. The gas temperature of the inside of the reactor was 245° C. in 10 min, and the gas temperature of the inside of the reactor was 233° C. in 30 min.

Example 7

It was conducted in the same method as that of Example 1, except the gas composition in the reactor at the start of the reaction and the gas flow rates. The gas composition at the start of the reaction was adjusted to 50 vol % iodine heptafluoride and 50 vol % $N_2$. Regarding the gas supply flow rates, a mixed gas of $N_2$ and iodine was 10 sccm, and fluorine was 45 sccm. It was conducted at 50 vol % in iodine concentration in the mixed gas of $N_2$ and iodine.

60 min, 120 min and 240 min after starting supply of fluorine and iodine, the reactor outlet gas was analyzed. As a result, 60 min thereafter it was found to be 41.7 vol % iodine heptafluoride, 1.8 vol % iodine pentafluoride, 20.7 vol % fluorine, and 35.8 vol % $N_2$. Furthermore, 120 min and 240 min thereafter it was found to be 39.9 vol % iodine heptafluoride, 0.1 vol % iodine pentafluoride, 40.2 vol % fluorine, and 19.8 vol % $N_2$.

Furthermore, the gas temperature of the inside of the reactor upon the reaction increased until 5 min after the start and then became constant. The gas temperature of the inside of the reactor was 233° C. in 5 min, and the temperature increase was 3° C.

Example 8

It was conducted in the same method as that of Example 1, except the gas composition in the reactor at the start of the reaction and the gas flow rates. The gas composition at the start of the reaction was adjusted to 0.8 vol % iodine heptafluoride, 7.2 vol % fluorine, and 92 vol % $N_2$. Regarding the gas supply flow rates, a mixed gas of $N_2$ and iodine was 95 sccm, and fluorine was 55 sccm. It was conducted at 5 vol % in iodine concentration in the mixed gas of $N_2$ and iodine.

The analysis values of the reactor outlet gas in 120 min and 240 min after starting supply of fluorine and iodine were 7 vol % iodine heptafluoride, 1 vol % iodine pentafluoride, 12.2 vol % fluorine, and 79.8 vol % $N_2$.

Furthermore, the gas temperature of the inside of the reactor upon the reaction increased until 20 min after the start and then became constant. The gas temperature of the inside of the reactor was 235° C. in 20 min, and the temperature increase was 5° C.

Example 9

It was conducted in the same method as that of Example 1, except the gas composition in the reactor at the start of the reaction and the gas flow rates. The gas composition at the start of the reaction was adjusted to 0.8 vol % iodine heptafluoride and 99.2 vol % $N_2$. Regarding the gas supply flow rates, a mixed gas of $N_2$ and iodine was 95 sccm, and fluorine was 55 sccm. It was conducted at 5 vol % in iodine concentration in the mixed gas of $N_2$ and iodine.

The analysis values of the reactor outlet gas in 10 min after starting supply of fluorine and iodine were 4.2 vol % iodine heptafluoride, 1 vol % iodine pentafluoride, 8.2 vol % fluorine, and 86.6 vol % $N_2$. Furthermore, the analysis values of the reactor outlet gas in 120 min and 240 min were 7 vol % iodine heptafluoride, 1 vol % iodine pentafluoride, 12.2 vol % fluorine, and 79.8 vol % $N_2$.

Furthermore, the gas temperature of the inside of the reactor upon the reaction increased until 20 min after the start and then became constant. The gas temperature of the inside of the reactor was 235° C. in 20 min, and the temperature increase was 5° C.

Example 10

It was conducted in the same method as that of Example 1, except the gas composition in the reactor at the start of the reaction and the gas flow rates. The gas composition at the start of the reaction was adjusted to 97 vol % iodine heptafluoride and 3 vol % fluorine. Regarding the gas supply flow rates, a mixed gas of $N_2$ and iodine was 10 sccm, and fluorine was 45 sccm. It was conducted at 50 vol % in iodine concentration in the mixed gas of $N_2$ and iodine.

The temperature of the inside of the reactor upon the reaction increased slowly until 150 min and became constant. The temperature upon this was 232° C. 120 min and 240 min after starting supply of fluorine and iodine, the reactor outlet gas was analyzed. As a result, 120 min thereafter it was found to be 44.9 vol % iodine heptafluoride, 0.6 vol % iodine pentafluoride, 38.2 vol % fluorine, and 16.3 vol % $N_2$. 240 min thereafter it was found to be 39.9 vol % iodine heptafluoride, 0.1 vol % iodine pentafluoride, 40.2 vol % fluorine, and 19.8 vol % $N_2$.

Example 11

The reactor was used as an exterior circulation type reactor by taking out the stirrer as a circulation apparatus and by attaching an exterior circulation pump in the reactor of Example 1. The circulation gas flow rate by the exterior circulation pump was set at 73.5 SLM. It was conducted under the same conditions as those of Example 1 with respect to the reactor heater temperature, the gas composition prior to starting the reaction, the total pressure, the gas supply method, and the gas flow rate. The gas temperature of the inside of the reactor prior to starting the reaction was 230° C.

120 min and 240 min after starting supply of fluorine and iodine, the reactor outlet gas was analyzed. As a result, 120 min thereafter it was found to be 29.7 vol % iodine heptafluoride, 0.5 vol % iodine pentafluoride, 29.9 vol % fluorine, and 39.9 vol % $N_2$. 240 min thereafter it was found to be 29.9 vol % iodine heptafluoride, 0.6 vol % iodine pentafluoride, 29.1 vol % fluorine, and 40.4 vol % $N_2$.

Furthermore, the gas temperature of the inside of the reactor upon the reaction increased gradually and became constant in 25 min. The gas temperature of the inside of the reactor at that time was 236° C., showing a temperature increase of 6° C. as compared with before the reaction.

Comparative Example 1

A stainless steel container having a volume of 2.3 L was charged with 1.5 kg of iodine made by Wako Pure Chemical Industries Ltd., followed by replacing the inside of the stainless steel container by $N_2$ purge and then heating the stainless steel container to 138° C. As the reactor, there was used a piston-flow type one made of Ni, having a volume of 4 L (diameter: 120 mm, length: 400 mm), and equipped with no gas-circulation apparatus such as a stirrer, a circulation pump, and the like. Prior to supplying fluorine and iodine to the reactor, the reactor heater temperature was previously set at 230° C. The gas temperature of the inside of the reactor reached 230° C. The gas composition before starting the reaction was adjusted to 30 vol % fluorine and 70 vol % $N_2$, and the total pressure was adjusted to 0.88 MPa. In the method for supplying iodine, $N_2$ gas was blown at a flow rate of 26 sccm into liquid iodine in the stainless steel container, and a saturation vapor pressure portion of iodine was mixed with $N_2$ gas to be supplied to the reactor. The iodine concentration in the mixed gas of $N_2$ and iodine was 16.1 vol %.

Fluorine was supplied at a flow rate of 45 sccm from a place that was different from the iodine supply port. Gas was taken out of a reactor outlet formed at a place that was different from the supply port in order that pressure in the reactor may become constant after supplying the raw materials.

As the reaction was started, the temperature around the reactor inlet rapidly increased. In 60 min, the temperature increased to 450° C. Therefore, the raw materials supply was terminated.

The invention claimed is:

1. A method for producing iodine heptafluoride, in which a reaction is conducted by supplying each of a fluorine-containing gas and an iodine-containing gas to a reactor where gaseous iodine heptafluoride is present, while circulating a mixing gas in the reactor.

2. A method for producing iodine heptafluoride, in which a reaction is conducted by supplying each of a fluorine-containing gas and an iodine-containing gas to a reactor where gaseous iodine heptafluoride and fluorine are present, while circulating a mixing gas in the reactor.

3. A method for producing iodine heptafluoride according to claim 2, in which concentration of the iodine heptafluoride in the circulating mixing gas in the reactor is from 1 vol % to 98 vol %, and concentration of the fluorine is from 2 vol % to 98 vol %.

4. A method for producing iodine heptafluoride according to claim 1, in which fluorine is supplied at a flow rate at least seven times the rate at which iodine is supplied.

5. A method for producing iodine heptafluoride according to claim 1, in which iodine is heated, vaporized and then supplied, together with a carrier gas directly to the reactor, and the carrier gas has an iodine concentration of at least 0.5 vol %.

6. A method for producing iodine heptafluoride according to claim 1, in which the circulating mixing gas has a flow rate from 60 to 200,000 times the flow rate at which iodine is supplied.

7. A method for producing iodine heptafluoride according to claim 1, in which the circulating mixing gas has a flow rate from 1,000 to 100,000 times the flow rate at which iodine is supplied.

8. A method for producing iodine heptafluoride according to claim 1, in which a gas residence time of at least 30 seconds is maintained in the reactor.

9. A method for producing iodine heptafluoride according to claim 1, in which a gas residence time of at least 2 minutes is maintained in the reactor.

10. A method for producing iodine heptafluoride according to claim 1, in which the reaction is conducted at a reaction temperature of from 100° C. to 350° C.

11. A method for producing iodine heptafluoride according to claim 1, in which the reaction is conducted at a reaction temperature of from 150° C. to 320° C.

12. A method according to claim 5, in which the carrier gas is $N_2$ or Ar.

* * * * *